United States Patent
Bilenker

[19]

[11] Patent Number: 6,053,633
[45] Date of Patent: Apr. 25, 2000

[54] BABY BATH FLOATING THERMOMETER

[75] Inventor: Stephanie C. Bilenker, Manalapan, N.J.

[73] Assignee: Stephanie Products, Inc., Manalapan, N.J.

[21] Appl. No.: 09/023,371

[22] Filed: Feb. 13, 1998

[51] Int. Cl.[7] .............................. G01K 1/08; G01K 5/00
[52] U.S. Cl. ..................................... 374/156; 374/194
[58] Field of Search ................................. 374/156, 194

[56] References Cited

U.S. PATENT DOCUMENTS

| | | | |
|---|---|---|---|
| 74,997 | 3/1868 | Day ................................... | 374/156 |
| D. 158,421 | 5/1950 | Teague et al. ....................... | D52/7 |
| D. 166,766 | 5/1952 | Melville ............................. | D52/7 |
| D. 173,474 | 11/1954 | Clickner ........................... | D52/7 |
| D. 312,975 | 12/1990 | Scheurer ........................... | D10/57 |
| 1,646,977 | 10/1927 | Norwood ........................... | 374/156 |
| 1,668,930 | 5/1928 | Zadek .............................. | 374/156 |
| 2,040,292 | 5/1936 | Brown .............................. | 73/52 |
| 2,091,693 | 8/1937 | Spencer ............................ | 73/353 |
| 2,282,277 | 5/1942 | Whittier ........................... | 73/367 |
| 2,641,930 | 6/1953 | Kebbon ............................ | 374/156 |
| 4,030,361 | 6/1977 | Fortune ............................ | 73/353 |
| 5,152,610 | 10/1992 | Hallett ............................. | 374/156 |
| 5,302,028 | 4/1994 | Carey .............................. | 374/156 |
| 5,575,563 | 11/1996 | Chiu et al. ........................ | 374/141 |
| 5,681,110 | 10/1997 | Burzacchi ......................... | 374/156 |

FOREIGN PATENT DOCUMENTS

| | | | |
|---|---|---|---|
| 1115959 | 5/1956 | France ............................. | 374/156 |

*Primary Examiner*—Randy W. Gibson
*Attorney, Agent, or Firm*—Kenneth P. Glynn, Esq.

[57] ABSTRACT

The present invention baby bath floating thermometer system includes a thermometer tube containing a temperature responsive fluid, at least a portion of the tube being transparent for viewing of expanding and contracting fluid in response to temperature changes, with temperature level gradation indicia. It also includes a first thermometer tube encasement having an elongated configuration with a predetermined width and length. This first encasement contains the thermometer tube and has sufficient transparent for viewing of the fluid within the thermometer tube at least at the indicia. There is a second encasement having a top, a bottom and having air containment for flotation. This second encasement has a securing mechanism on its bottom for securely holding the first encasement and thermometer tube so as to be at least partially exposed to its external environment. It has a viewing orifice in its top so as to permit direct viewing of at least the thermometer at its indicia.

20 Claims, 3 Drawing Sheets

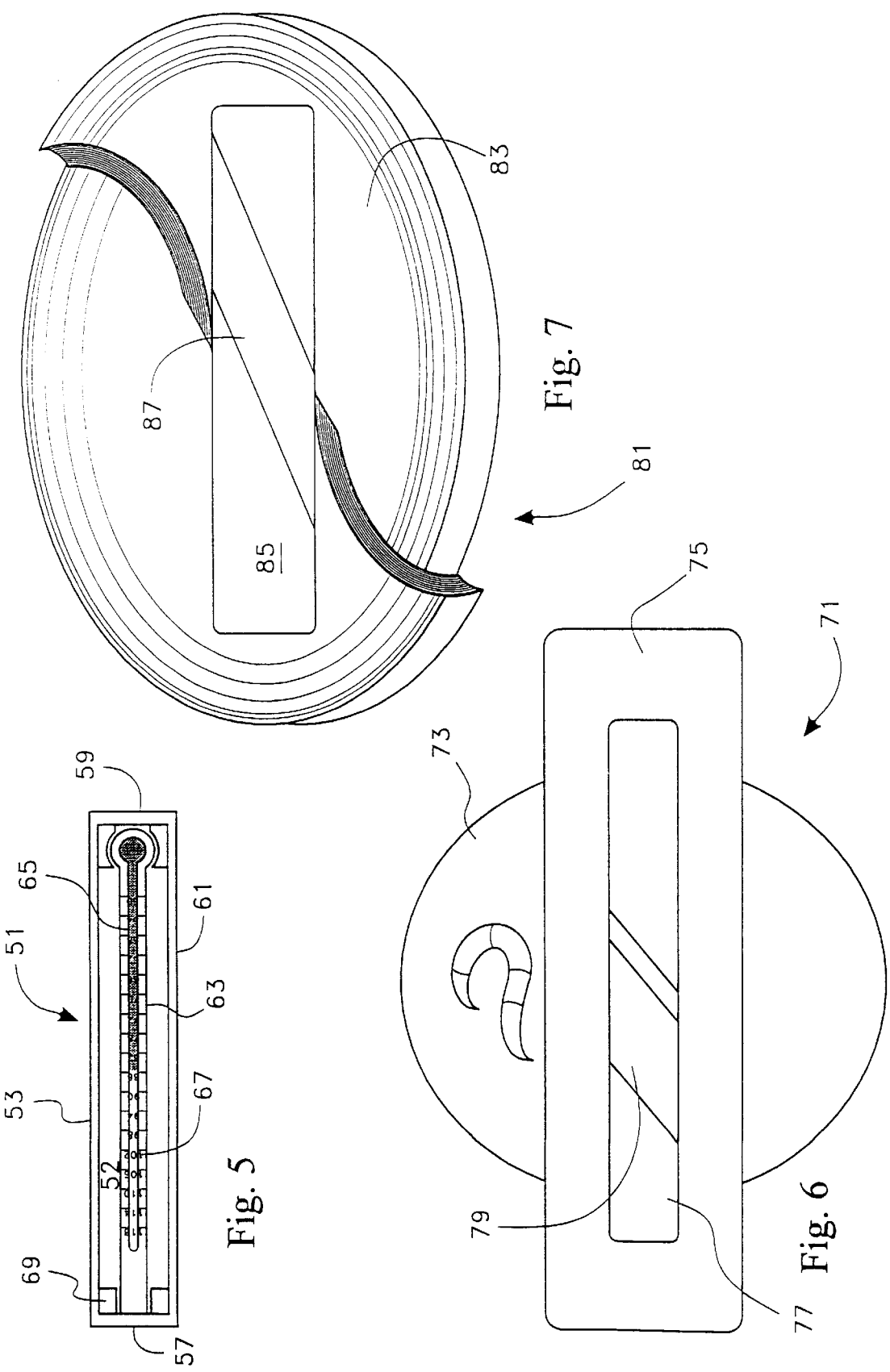

BABY BATH FLOATING THERMOMETER

BACKGROUND OF THE INVENTION

1. Field of the Invention

Present invention relates to a baby bath floating thermometer and more specifically to a thermometer tube contained within a first encasement for physical protection and flotation. Together, they are further contained within a second encasement which further enhances flotation, inhibits or reduces overturning and creates a size too large for swallowing or choking.

2. Information Disclosure Statement

The following represents prior art patents which illustrate various types of thermometer floatation devices:

U.S. Design Pat. No. 158,421 to Walter Dorwin Teague illustrates a bath thermometer in the appearance of a fish.

U.S. Design Pat. No. 166,766 to Richard J. Melville illustrates a bath thermometer in the appearance of a turtle.

U.S. Design Pat. No. 173,474 to Leon T. Clickner illustrates a thermometer in the appearance of a life saver and rope.

U.S. Design Pat. No. 312,975 to Stephen M. Scheurer illustrates a bath thermometer in the appearance of a duck.

U.S. Pat. No. 1,646,977 Harry Y. Norwood describes the combination of a thermometer tube, a base of sheet material of a thickness considerably smaller than the width of the tube, the base being shaped to define a groove receiving the tube, and a narrow strip of thin sheet material adhesively connected to the base and connected with the tube to hold it in place in the groove.

U.S. Pat. No. 1,668,930 to Arthur Zadek describes a bath thermometer, comprising a buoyant flat disc shaped base member having a slot therethrough provided with mortised ends and a recess at one side, an upright standard having its end tenoned to fit the slot and mortised ends thereof. A portion of the upright being provided with a shoulder to abut the face of the base when the upright is inserted, and a thermometer tube carried by the face of the upright and having its bulb projecting into the recessed portion of the slot in the base.

U.S. Pat. No. 2,040,292 to H. Brainard Brown describes a combination of, a sealed hollow elongated support of non-shatterable material, with the support having a relatively large flattened surface extending generally parallel to the long axis of the support, and a thermometer tube mounted in the support generally parallel to the plane of the surface and in heat conducting relation therewith, at least a portion of the support being transparent to permit reading of the thermometer therethrough.

U.S. Pat. No. 2,091,693 Percy L. Spencer describes a temperature-indicating device comprising a body adapted to be supported with the center of support locate at a definite point with respect to the body. A strip of thermostatic material fastened at one end thereof to the body, a weight carried by the thermostatic strip at a point removed from the end. The thermostatic strip being adapted to move under the action of varying temperature to shift the point and the weight with respect to the body in a direction to shift the center of gravity of the body with respect to the center of support, the body being adapted to rotate under the action of the forces exerted upon it by its support and by gravity to bring the center of gravity into a vertical line with the center of support, whereby the angular orientation of the body is made responsive to the temperature thereof.

U.S. Pat. No. 2,282,277 to Elmer S. Whittier describes that in a thermometer, a dial plate, heat indicating means carried by the dial plate, a cup-shaped housing of elastic, shock-absorbing material to protect the parts comprising a round body having a bottom wall and an annular side wall, the side wall having an internal holding groove with an overhanging lip. The dial plate having an annular rim portion adapted to enter the groove and the lip being located near the open end of the cup and being sufficiently elastic to stretch to a diameter exceeding the diameter of the dial plate to let the latter get in the groove.

U.S. Pat. No. 4,030,361 to Jeffrey L. Fortune describes a floating temperature measuring instrument for measuring water temperature of a personal bath. Measuring bath water temperature improves ones ability to draw a safe and comfortable bath.

U.S. Pat. No. 5,152,610 to Stephen K. Hallett describes a fluid impermeable housing includes a lower support body receiving a battery, with an upper body portion mounting a printed circuit board containing a light-emitting diode panel for indication of temperature with the light-emitting diode panel operative through the printed circuit board and a temperature sensor directed through the housing to effect indication of ambient pool water temperature. The organization includes a threadedly securable lower and upper cap permitting access to the components of the organization for maintenance and replacement of various portions thereof. A modification of the invention includes cup support structure arranged on diametrically opposed sides of the support housing utilizing the temperature indication of the light-emitting diode panel for indication of ambient pool water temperature. The cup support structure includes a cup holder wherein drinking cups may be mounted. Suction cup structure is provided mounted to each cup holder to permit securement of the organization to a side wall of an associated swimming pool, wherein each cup holder may further be provided with stabilizing ballast anchor weights suspended relative to each cup holder for maintaining proper orientation of the organization in use.

U.S. Pat. No. 5,302,028 Dianna M. Carey describes a thermometer housing of a generally cylindrical configuration is arranged for floating reception within a bathtub, with the thermometer housing including a top wall divided into a first and second semi-annular indicator surface, with an indicator arrow operative through a bi-metallic spring arranged for deflection from the first to the second indicator surface upon bathtub water elevated to a second zone of temperature to be classified as inappropriate for bathing. A stabilizer weight member is mounted to the bottom wall to maintain alignment and emergence of the housing side wall within the associated bathtub body of water.

U.S. Pat. No. 5,575,563 to Job Chiu et al describes a multistage thermometer comprising a body portion capable of selectively detachably engaging thereto at least a first sensing portion, a second sensing portion, a third sensing portion and a fourth sensing portion. Each of the sensing portions has a first member at a first end thereof, the body portion integrally forming a second engaging member at one end thereof for electrically and complementarily connecting thereto the first engaging member of each of the sensing portions. This invention offers a thermometer being multiuseable and having a body portion capable of being selectively detachably engaged with other sensing portions of various usages based on the situation one faces.

Notwithstanding the prior art, the present invention is neither taught nor rendered obvious thereby.

SUMMARY OF THE INVENTION

The present invention is a baby bath floating thermometer system which includes a thermometer tube containing a temperature responsive fluid, at least a portion of the tube being sufficiently transparent for viewing of expanding and contracting fluid therein in response to temperature changes, and having gradation indicia thereon, indicating temperature levels. It also includes a first thermometer tube encasement having a substantially elongated configuration with a predetermined width and a predetermined length. This first encasement completely encompasses the thermometer tube and is sufficiently transparent for viewing of expanding and contracting fluid within the thermometer tube at least at the indicia. There is also a second encasement having a top and a bottom and having an air containment portion for flotation. This second encasement has a securing mechanism on its bottom for securely holding the first encasement and thermometer tube so as to be at least partially exposed to its external environment. It also has a viewing orifice in its top so as to permit direct viewing of at least that portion of the first encasement which exposes the thermometer for viewing at least at its indicia wherein the first encasement and thermometer tube are positioned within the second encasement such that the indicia face upwardly.

BRIEF DESCRIPTION OF THE DRAWINGS

The present invention should be more fully understood when the specification herein is taken in conjunction with the drawings appended hereto wherein:

FIG. 5 shows a top view of a portion of a present invention system, namely, a first encasement with a thermometer tube; and, FIGS. 6 and 7 show top views of an alternative embodiment present invention second encasement.

DETAILED DESCRIPTION OF THE PRESENT INVENTION

Figure 1:
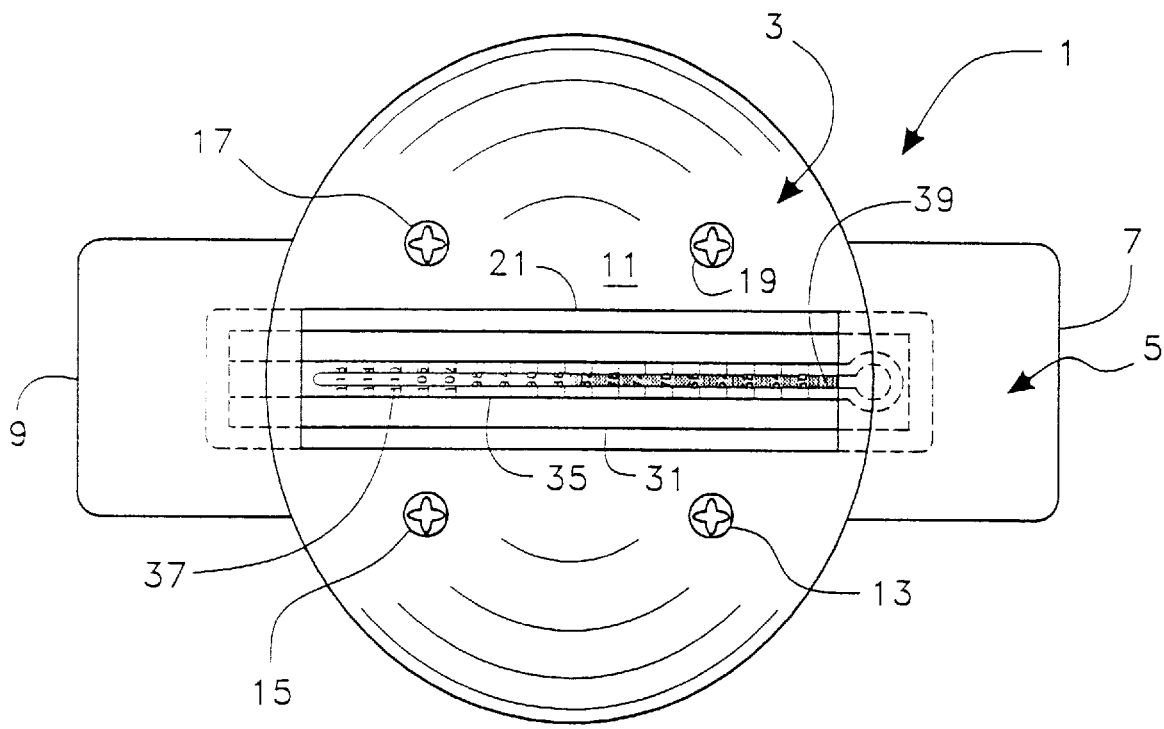
FIGS. 1, 2, 3 and 4 show a top view, side view, end view and bottom view of one preferred embodiment of the present invention baby bath floating thermometer system.
Figure 2:
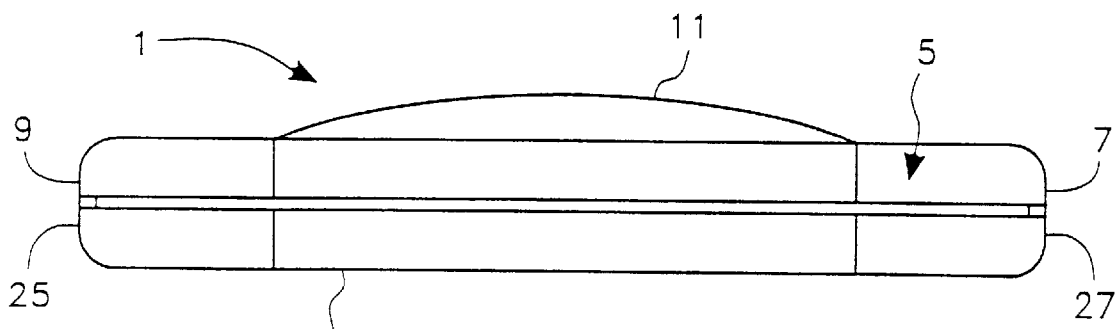
Figure 3:
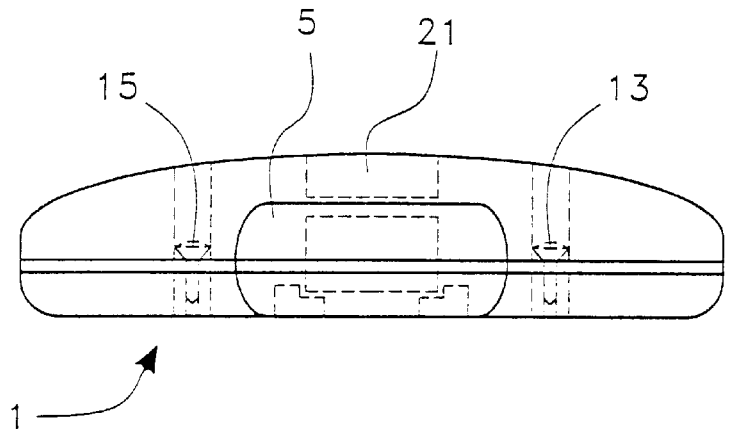

The present invention baby bath floating thermometer system has been uniquely developed to provide a safe bathing environment for infants, children, adults, senior citizens, but especially for babies by providing unique arrangements which include a first encasement and a second encasement, thereby giving double protection from breakage and presenting significant enough size to prevent swallowing.

Referring to FIGS. 1, 2, 3 and 4, there is shown a top, side, end and bottom view of a present invention baby bath floating thermometer system 1. It includes a thermometer tube 35 with temperature indicia 37 and temperature responsive fluid 39. Thermometer tube 35 is encased in a first encasement 31 which is rectangular in shape, constructed of clear plastic and sealed as to protect thermometer tube 35 (glass) from breakage and spillage of temperature responsive fluid 39. It is also airtight so as to constitute a floatation component with sufficient air space to float both itself and the thermometer tube contained therein.

Figure 4:
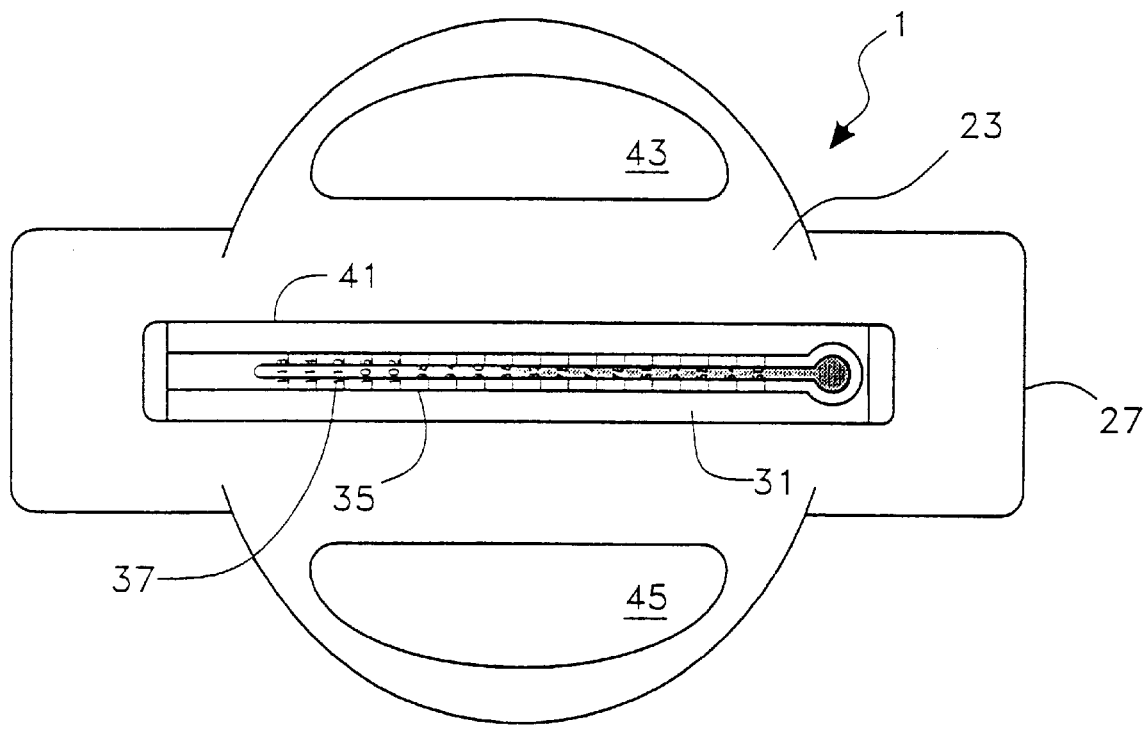

Second encasement 3 has a rounded portion show as top 11 and an encased portion shown generally as portion 5. Portion 5 has a length which is greater than the length of first encasement 31 and second encasement 3 also has a width at its maximum measurement which is at least three times greater than the width of first encasement 31. This prevents or inhibits flipping and overturning. It also is sufficiently large to render the device unswallowable to inhibit choking by a child or baby. Portion 5 has end portion 7 and 9, as shown. Top 11 includes an opening 21 which is fully exposed to first encasement 31 to permit viewing of the thermometer, at least at its indicia 37. As more clearly illustrated in FIGS. 2 and 3, outer encasement 3 has an upper portion and a lower portion with bottom 23 and bottom ends 25 and 27. These two pieces in this embodiment are held together by screws 13, 15, 17 and 19, as shown. In FIG. 4, bottom 23 of system 1 has an opening 41 with a portion of the bottom of first encasement 31 exposed to the water to procure more accurate temperature readings. Optional recesses 43 and 45 aid to further inhibit overturning.

FIG. 5 shows a top view of a first encasement 51 and a thermometer tube 63. The first encasement 51 has a clear top 55 with ends 57 and 59 and sides 53 and 61. This is basically a plastic device with a flat lid which may be glued or sealed in place or force fitted. Thermometer tube 63 has indicia 57 and includes temperature readings of fluid 65. Corner blocks, such as corner block 69, within first encasement 51 as well as its top and bottom, hold thermometer tube 63 in a fixed position.

FIG. 6 shows a top view of an alternative embodiment second encasement 71 with rounded portion 73, extended segment 75, first encasement holding area 77 and bottom bridge 79. Second encasement 71 may be formed in a top section and a bottom section and first encasement 51 with thermometer tube 63 may be inserted therein.

FIG. 7 shows another alternative second encasement 81 with oval shaped top 83, first encasement holding area 85 and bottom bridge 87. Second encasement 81 would function similarly to second encasement 71 from FIG. 6 described above.

Obviously, numerous modifications and variations of the present invention are possible in light of the above teachings. It is therefore understood that within the scope of the appended claims, the invention may be practiced otherwise than as specifically described herein.

What is claimed is:

1. A baby bath floating thermometer system, which comprises:

(a) a thermometer tube containing a temperature responsive fluid, at least a portion of said tube being sufficiently transparent for viewing of expanding and contracting fluid therein in response to temperature changes, and having gradation indicia thereon, indicating temperature levels;

(b) a first thermometer tube encasement having a substantially elongated configuration with a predetermined width and a predetermined length and containing said thermometer tube therein, said first encasement completely encompassing said thermometer tube and being sufficiently transparent for viewing of expanding and contracting fluid within said thermometer tube at least at said indicia, said first encasement including air contained therein and being sealably airtight so as to promote floatation of said system; and, (c) a second encasement having a top and a bottom and having an air containment portion for floatation, said second encasement having securing means on its bottom securely holding said first encasement and thermometer tube so as to be at least partially exposed to its external environment, and having a viewing orifice in its top so as to permit direct viewing of at least that portion of said first encasement which exposes said thermometer for viewing at least at its indicia, wherein said first encasement and thermometer tube are positioned within said second encasement such that said indicia face upwardly, and wherein, said second encasement has a predetermined length which is greater than said predetermined length of said first encasement and has a predetermined width which is at least three times greater than said predetermined width of said first encasement to inhibit accidental overturning during floatation.

2. The system of claim 1 wherein said second encasement includes a plurality of recesses which recesses are capable of inhibiting overturn of said system during floatation.

3. The system of claim 1 wherein said second encasement has ends which cover and protect ends of said first encasement.

4. The system of claim 1 wherein said first encasement includes means to serve said thermometer tube therein to prevent movement of said thermometer tube within said first encasement.

5. The system of claim 4 wherein said first encasement thermometer tube movement prevention means are a plurality of corner blocks which are capable of fixedly securing said thermometer tube in place within said first encasement during use.

6. The system of claim 1 wherein said first encasement is generally rectangular in shape.

7. The system of claim 2 wherein said first encasement is generally rectangular in shape.

8. The system of claim 1 wherein said second encasement securing means is at least one bridge located on said bottom of said second encasement, said at least one bridge having adequate size and dimension to securely fasten said first encasement in place within said second encasement.

9. The system of claim 1 wherein said second encasement comprises at least two pieces, an upper piece and a lower piece, and includes attachment means for attaching said upper piece and said lower piece to one another.

10. The system of claim 1 wherein said first encasement and said thermometer tube are contained within second encasement at its bottom in a recessed, exposed position.

11. A baby bath floating thermometer system, which comprises:

(a) a thermometer tube containing a temperature responsive fluid, at least a portion of said tube being sufficiently transparent for viewing of expanding and contracting fluid therein response to temperature changes, and having gradation indicia thereon, indicating temperature levels;

(b) a first thermometer tube encasement having a substantially elongated configuration with a predetermined width and a predetermined length and containing said thermometer tube therein, said first encasement completely encompassing said thermometer tube and being sufficiently transparent for viewing of expanding and contracting fluid within said thermometer tube at least at said indicia said first encasement having air contained therein sufficient to float both said first encasement and said thermometer tube contained therein; and, (c) a second encasement having a top and a bottom and having an air containment portion for flotation, said second encasement having securing means on its bottom securely holding said first encasement and thermometer tube so as to be at least partially exposed to its external environment, and having a viewing orifice in its top so as to permit direct viewing of at least that portion of said first encasement which exposes said thermometer for viewing at least at its indicia, wherein said first encasement and thermometer tube are positioned within said second encasement such that said indicia face upwardly, and wherein said second encasement has a predetermined length which is greater than said predetermined length of said first encasement and has a predetermined width which is at least three times greater than said predetermined width of said first encasement to inhibit accidental overturning during floatation, and wherein said second encasement includes a plurality of recesses which recesses are capable of inhibiting overturn of said system during floatation.

12. The system of claim 11 wherein said second encasement has ends which cover and protect ends of said first encasement.

13. The system of claim 11 wherein said first encasement includes means to serve said thermometer tube therein to prevent movement of said thermometer tube within said first encasement.

14. The system of claim 13 wherein said first encasement thermometer tube movement prevention means are a plurality of corner blocks which are capable of fixedly securing said thermometer tube in place within said first encasement during use.

15. The system of claim 11 wherein said first encasement is generally rectangular in shape.

16. The system of claim 12 wherein said first encasement is generally rectangular in shape.

17. The system of claim 13 wherein said first encasement is generally rectangular in shape.

18. The system of claim 11 wherein said second encasement securing means is at least one bridge located on said bottom of said second encasement, said at least one bridge having adequate size and dimension to securely fasten said first encasement in place within said second encasement.

19. The system of claim 11 wherein said second encasement comprises at least two pieces, an upper piece and a lower piece, and includes attachment means for attaching said upper piece and said lower piece to one another.

20. The system of claim 11 wherein said first encasement and said thermometer tube are contained within second encasement at its bottom in a recessed, exposed position.

* * * * *